Joyce & Ernest,
Dinner Pail.

No. 113,893.  Patented Apr. 18, 1871.

Witnesses.
Richard H. Reille
Angelia L. Reille

Inventors.
Humphrey Joyce
Anthony Ernest

N. PETERS, PHOTO-LITHOGRAPHER, WASHINGTON, D.C.

United States Patent Office.

HUMPHRYS JOYCE AND ANTHONY ERNEST. OF TROY, NEW YORK.

Letters Patent No. 113,893, dated April 18, 1871.

IMPROVEMENT IN DINNER-PAILS.

The Schedule referred to in these Letters Patent and making part of the same.

We, HUMPHRYS JOYCE and ANTHONY ERNEST, of the city of Troy, in the county of Rensselaer and State of New York, have invented certain Improvements in Dinner-Pails or Kettles for Conveyance of Food, &c., of which the following is a specification.

The nature of our invention consists, first, in the use and construction of a device formed and operating so as to catch and hold the bail or handle of the pail or kettle upright and prevent swinging, the said device being attached or connected to the side of the kettle or pail at a suitable distance below the attaching point of the bail, and being formed as will be described hereinafter.

It also consists, secondly, in the arrangement and combination of the interior divisions and compartments of the kettle; also of the cover and the trays and divisions connected and combined therewith, which are used for containing the different articles of food, and operate so as to keep them separate and so that the distinct flavor of each is preserved.

The construction of the cover is such that coffee, tea, or its equivalent may be kept safely without danger of spilling out or coming in contact with the other articles.

Description of the Accompanying Drawing.

Figure 9:
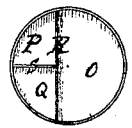
Figure 9 is a horizontal view of the fourth tray, to show the divisions.
Figure 5:
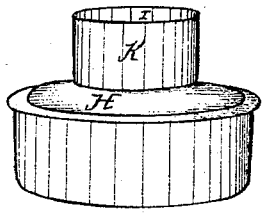
Figure 5 is the cover, which also forms the second tray, and is the receptacle for coffee or other beverage.
Figure 10:
Figure 10 is the cup for drinking, right side up.
Figure 4:
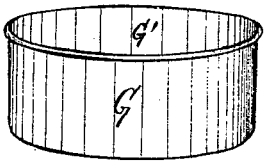
Figure 4 is the first tray in perspective.
Figure 2:
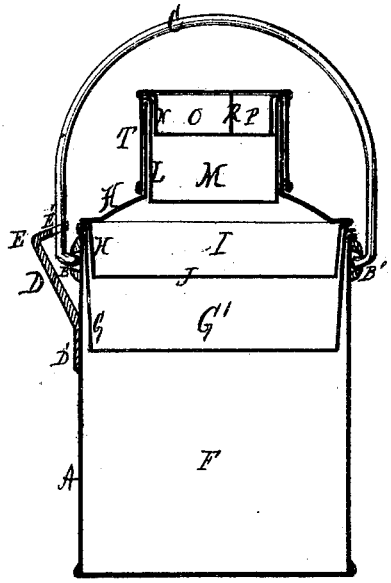
Figure 2 is a vertical section of the same when all together, as above mentioned.
Figure 3:
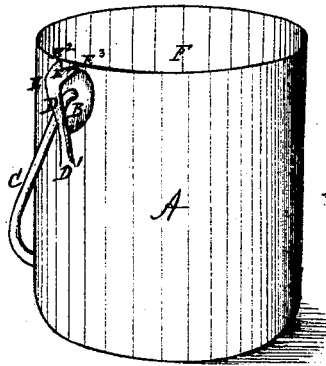
Figure 3 is a perspective view of the kettle alone, and without the compartments, trays, &c.

All of these views are in perspective except figs. 2 and 9, and the figs. 4, 5, 6, 7, and 8 show the trays, &c., in the order as they are used with regard to the kettle, fig. 3, below.

Like letters refer to like or corresponding parts.

General Description.

A represents the kettle or pail, which is constructed as usual, and having a bail attached or connected in any suitable manner at B and B'. The bail is marked C, and may be constructed of brass or any other suitable material.

D represents the device for holding the bail upright and preventing the swinging of the kettle. The device D we construct of brass, but other material or metal may be used where suitable. This device is attached to the kettle at D', and, branching off therefrom at a suitable angle upward and outward, takes a turn at E toward the kettle, spreading out, and, at E', having a notch or its equivalent to receive the bail when upright.

Figure 1:
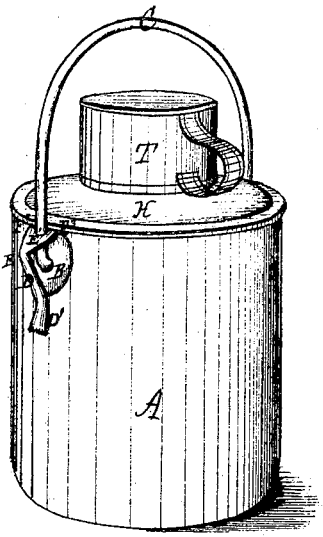
Figure 1 is a perspective view of the kettle complete, all closed up in position as carried.
Figure 8:
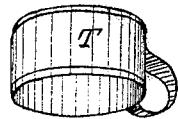
Figure 8 is the cup used for drinking, shown bottom side upward. This cup forms the cover over the third and fourth trays, and also over the part of the second tray which projects upward above the kettle-cover or second tray.
Figure 7:
Figure 7 is the fourth tray, and this fits into the upper part of the third tray, and has three divisions, so that butter, pepper, and salt may be contained and kept separate from each other.
Figure 6:
Figure 6 is the third tray, and sits into the upper part of the coffee-tray.

The device D may be formed of wire or a plate of brass or other metal, and is constructed so as to spring slightly to allow the bail to pass the points or projecting corners at $E^2$ and $E^3$. The bail also springs slightly, so that it passes easily, and then is held firmly in position, as shown in figs. 1 and 2.

F is the chamber inside the kettle, in the lower part, where are usually placed the meats and food of similar nature in our kettle.

Next above comes the first tray, G, where we place the pie, pudding, or similar articles. This is the first tray placed in the kettle, and is supported by a slight flange or rim at the top.

G' is the chamber within this tray, and formed thereby.

H is the cover of the kettle, and also covers the chamber G'. This cover H is constructed so that a chamber is formed within, a portion extending downward within the tray G, and said chamber is marked I, the bottom marked J. This chamber I forms the receptacle for coffee, tea, or other beverage, as required. The top thereof, or the cover H, has a flange or rim extending upward, marked K. Said rim forms a ring, which is the spout, outlet and inlet, for the fluids contained or to be contained within the chamber I.

The rim K extends upward sufficiently to receive other trays, as below described.

L is the next tray, the third on the list. The chamber within is marked M, and is used to contain sauces and similar comforts, and this tray L fits within the rim or spout K, a flange or rim at the top holding it.

Next above comes the fourth tray, fitting within the third, supported also by a rim. This tray is marked N, and contains three chambers, O, P, and Q, divided from each other by the division strips R and S. O is to contain butter, P to contain salt, and Q to contain pepper. This tray may have other similar divisions if necessary so as to contain other articles.

T is the drinking-cup, which is constructed as usual, and this inverted forms the cover for the parts, trays, &c., above the kettle-cover H.

It will be seen that by this arrangement none of the parts can separate, no cover fly off when running, as workingmen sometimes do, to catch the cars or boat. All remains compact and firm, and the food, drink, &c., safe, while at the same time the whole apparatus may be readily taken apart and used for its purposes. The whole or its parts may be constructed of any metal or material suited to the purpose, and formed or proportioned so as to present a neat and tasty appearance.

Claims.

What we claim as our invention is—

1. The device D or its equivalent, when formed and constructed substantially in the manner and for the purpose as described and set forth.

2. The combination of the kettle A, tray G, cover H, chamber I, trays L and N, and cup T, when constructed and arranged in the manner and for the purpose substantially as described and set forth.

HUMPHREYS JOYCE.
ANTHONY ERNEST.

Witnesses:
RICHARD H. REILLE,
ANGELIN S. REILLE.